(12) United States Patent
Hansson et al.

(10) Patent No.: US 7,168,894 B2
(45) Date of Patent: Jan. 30, 2007

(54) ASSEMBLY FOR REMOVING CHIPS FROM A CUTTING WORK AREA OF A CUTTING TOOL

(75) Inventors: Jonas Hansson, Kista (SE); Göran Roswall, Kista (SE)

(73) Assignee: Novator AB, Spanga (SE)

( * ) Notice: Subject to any disclaimer, the term of this patent is extended or adjusted under 35 U.S.C. 154(b) by 0 days.

(21) Appl. No.: 10/528,904

(22) PCT Filed: Sep. 26, 2003

(86) PCT No.: PCT/SE03/01500

§ 371 (c)(1),
(2), (4) Date: Sep. 23, 2005

(87) PCT Pub. No.: WO2004/028728

PCT Pub. Date: Apr. 8, 2004

(65) Prior Publication Data
US 2006/0110228 A1    May 25, 2006

Related U.S. Application Data

(60) Provisional application No. 60/319,579, filed on Sep. 27, 2002, now abandoned, provisional application No. 60/414,408, filed on Sep. 30, 2002, now abandoned.

(51) Int. Cl.
*B23C 9/00* (2006.01)
*B23Q 11/00* (2006.01)
*B23Q 11/08* (2006.01)

(52) U.S. Cl. ............... 409/137; 409/134; 408/67; 408/58

(58) Field of Classification Search ........... 409/137, 409/134, 135–136; 408/67, 58; 451/456; 173/197, 198; 29/DIG. 84, DIG. 86, DIG. 94
See application file for complete search history.

(56) References Cited

U.S. PATENT DOCUMENTS 2,527,968 A * 10/1950 Sherman et al. ............ 408/67
4,530,627 A * 7/1985 Kosmowski ................ 409/80

(Continued)

FOREIGN PATENT DOCUMENTS

DE          3734127 A1 *  4/1989

(Continued)

*Primary Examiner*—Erica Cadugan
(74) *Attorney, Agent, or Firm*—Taylor & Aust, P.C.

(57) ABSTRACT

An assembly for removing chips from a cutting tool working area on a workpiece, including a support structure for supporting a first end of an axially expandable and collapsible tubular member; a cross-piece for supporting a second end of the tubular member; at least one biasing spring configured and arranged for resiliently biasing the support structure and the cross-piece away from one another; a housing with a chips-receiving chamber located adjacent one of the ends of the tubular member for engagement with the working area of the workpiece, an outlet from the chamber of the housing being configured to be connected to a vacuum source for removing chips from the chamber; and a hub portion located at the other of the ends of the tubular member for engagement with a cutting machine.

11 Claims, 6 Drawing Sheets

U.S. PATENT DOCUMENTS

| | | | |
|---|---|---|---|
| 5,113,951 A * | 5/1992 | Houben et al. | 408/67 |
| 5,199,830 A * | 4/1993 | Otani et al. | 408/67 |
| 5,688,082 A * | 11/1997 | Richardson | 408/67 |
| 5,791,842 A * | 8/1998 | Sugata | 409/137 |
| 5,947,661 A * | 9/1999 | Sugata | 409/131 |
| 6,200,075 B1 | 3/2001 | Gaskin et al. | |
| 6,264,590 B1 * | 7/2001 | Ferrari | 409/137 |
| 6,413,022 B1 * | 7/2002 | Sarh | 408/67 |
| 2001/0052429 A1 | 12/2001 | Frenzel et al. | |
| 2004/0191016 A1 * | 9/2004 | Hintze et al. | 408/67 |

FOREIGN PATENT DOCUMENTS

| | | |
|---|---|---|
| GB | 2 096 030 | 10/1982 |
| RU | 1071395 | 11/1982 |
| RU | 1404267 | 3/1986 |

\* cited by examiner

ASSEMBLY FOR REMOVING CHIPS FROM A CUTTING WORK AREA OF A CUTTING TOOL

The present application claims priority under 35 USC 365 to U.S. provisional applications 60/319,579, filed Sep. 27, 2002, now abandoned, and 60/414,408, filed Sep. 30, 2002, now abandoned.

BACKGROUND OF THE INVENTION

1. Field of the Invention

The present invention relates to an assembly for removing chips and cuttings from a cutting working area of a cutting tool on a workpiece. The assembly of the present invention is adapted to be attached to either an axially movable, non-rotating component of a drilling/milling machine, and to be resiliently biased towards a workpiece in which a hole or a recess is formed; or to be attached to a separate fixed support or stand located close to the workpiece, and to be resiliently biased towards the machine. In particular, but not exclusively, the assembly of the present invention is adapted to be used together with orbital drilling machines.

2. Description of the Related Art

When forming holes or recesses in a workpiece by way of a drilling or milling machine, chips and cuttings generated by a cutting tool and remaining in the vicinity of the hole during the forming thereof can adversely effect the surface quality of the hole being formed.

What is needed in the art is a chips-removing assembly, which can efficiently collect and remove chops from a cutting working are while at the same time obtain a full protection of cutting tool in the zone between an advancing nose portion of the machine and the workpiece during a working operation.

SUMMARY OF THE INVENTION

The present invention provides a chips-removing assembly, which can efficiently collect and remove chips from a cutting working area while at the same time obtain a full protection of the cutting tool in the zone between an advancing nose portion of the machine and the workpiece during a working operation.

The invention comprises, in one form thereof, a support structure for supporting a first end of an axially expandable and collapsible tubular member; a cross-piece for supporting a second end of the tubular member; at least one biasing spring configured and arranged for resiliently biasing the support structure and the cross-piece away from one another; a housing with a chips-receiving chamber located adjacent one of the ends of the tubular member for engagement with the working area of the workpiece, an outlet from the chamber of the housing being configured to be connected to a vacuum source for removing chips from the chamber; and a hub portion located at the other of the ends of the tubular member for engagement with a cutting machine. During the working operating the tubular member surrounds the shaft of the cutting tool and defines a space which is substantially closed against a nose portion (e.g. a rotating spindle) of the working machine and which communicates with the chips-receiving chamber so as to improve the evacuation of chips therein and to create a safe protection for the operator in case of a breakdown of the cutting tool.

An advantage of the present invention is that chips and cuttings from a cutting work area are efficiently removed.

Another advantage of the present invention is that it provides a full protection of the cutting tool in the zone between an advancing nose portion of the machine and the workpeice during a working operation.

Yet another advantage of the present invention is an improved surface quality of the hole being formed.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
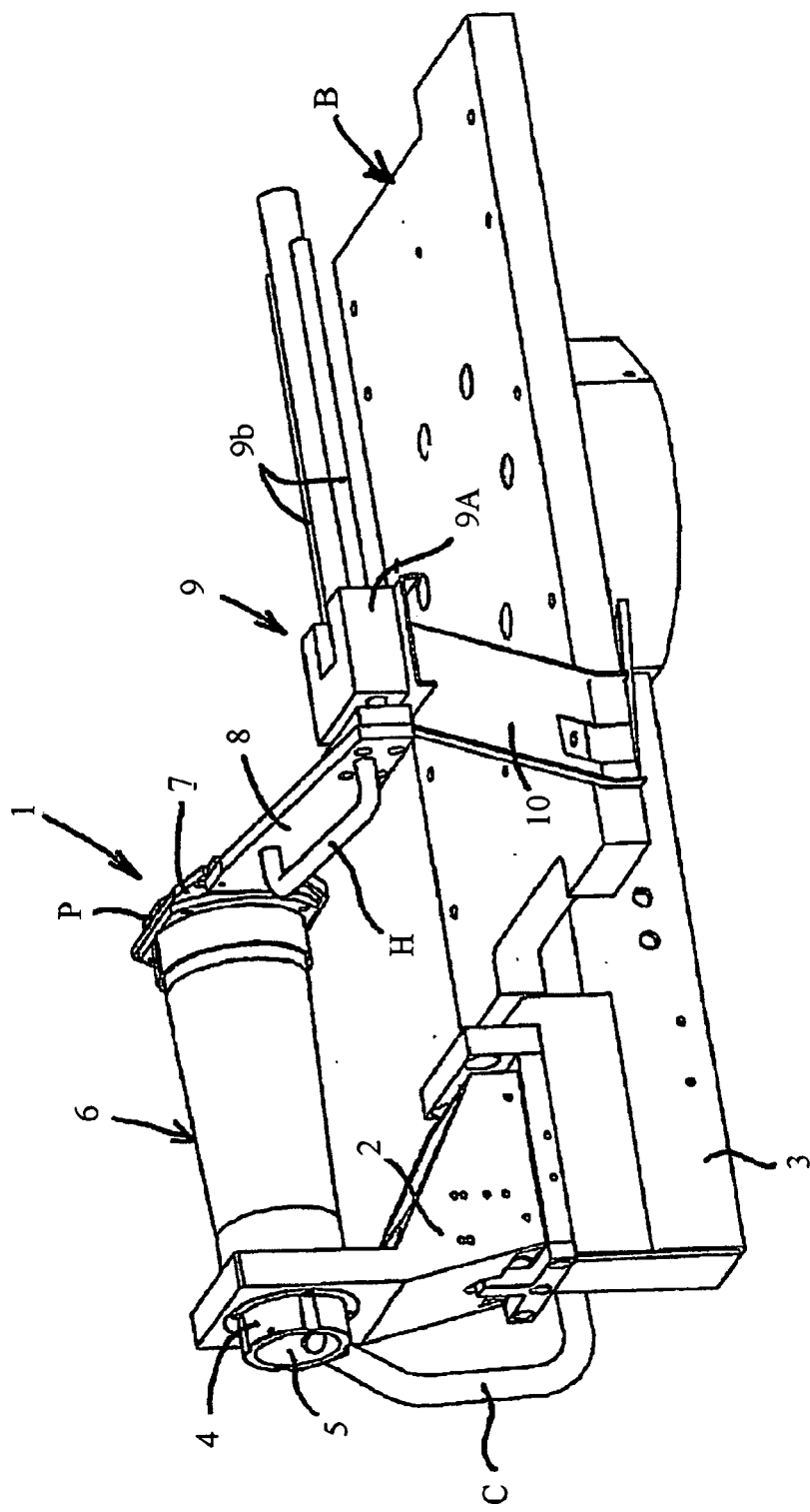
FIG. 1 is a perspective view of a first embodiment of the assembly of the present invention.

Referring now to the drawings, and more particularly to FIG. 1, there is shown a first embodiment of assembly 1 of the present invention, which generally includes a support structure 2 carried on a stand 3 that can be positioned close to a workpiece (not shown). Support structure 2 holds a housing 4 with a chips-receiving chamber 5 and one end of an axially expandable and collapsible, tubular member 6 including a helically wound strip of steel or similar strong material so as to form a telescopic spring which is resiliently biased towards its expanded condition shown in FIG. 1. The other end of tubular member 6 carries a hub portion 7 with a pressure plate P configured to engage a front portion, e.g. an end surface of a spindle, of a cutting machine (not shown). Hub portion 7 is attached to a cross-piece 8 which connects hub portion 7 to a linear guide unit 9 at one side of cutting machine for longitudinal guidance of the expansion and collapsing of tubular member 6. A guide block 9a of guide unit 9 is supported on a bracket 10 secured to a stationary machine base B. Guide rods 9b, attached to cross-piece 8, are slideable in guide block 9a. A handle H is attached to cross-piece 8 for manually compressing tubular member 6. Alternately, this is achieved by a pneumatic cylinder (not shown) which facilitates an exchange of a cutting tool in the machine. A vacuum conduit C is connected to chips-receiving chamber 5 for removing chips and cuttings from the working area of the workpiece.

In use, housing 4 is set into engagement with the surface of the workpiece where a hole or recess is to be formed therein. Telescopic tubular member 6 is allowed to axially expand over the cutting tool and its shaft (not shown) so as to bring pressure plate P to resiliently engage the advancing spindle of the cutting machine. During the advancement of the cutting tool into the workpiece, tubular member 6 axially collapses successively against the action of the spring force of resilient member 6. Tubular member 6 forms both a confined space communicating with the chips-receiving chamber 5 so as to improve the evacuation of chips therein, and a strong protection of the cutting tool in a zone between an advancing nose portion of the machine and the workpiece during a working operation.

Figure 2:
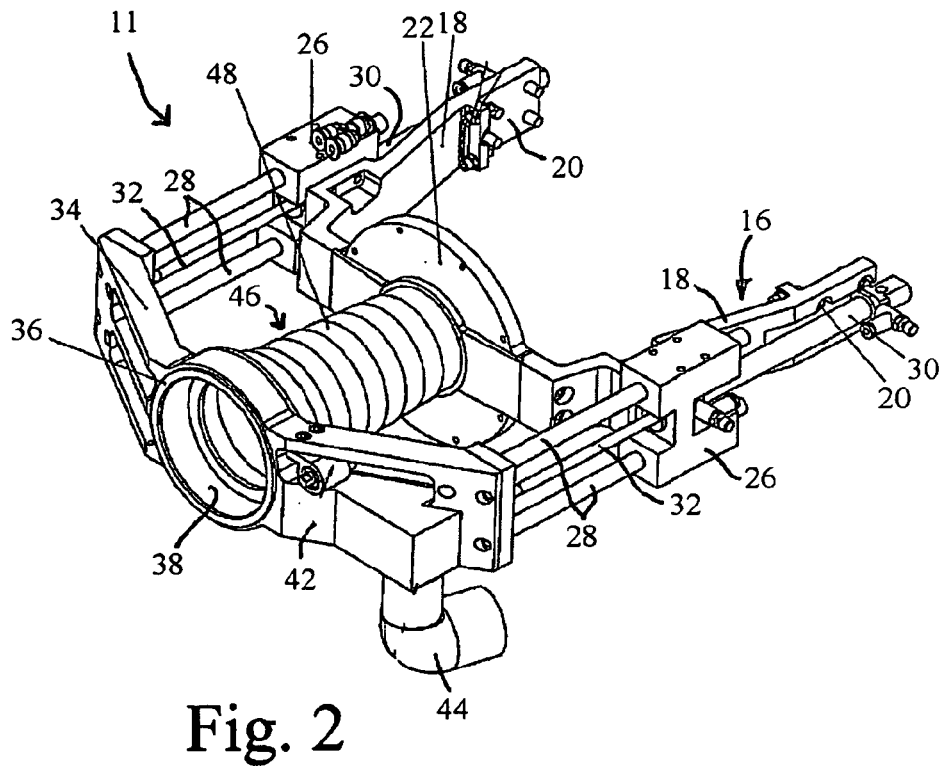
FIG. 2 is perspective view of a second embodiment of the assembly of the present invention, as seen from a frontal side.
Figure 3:
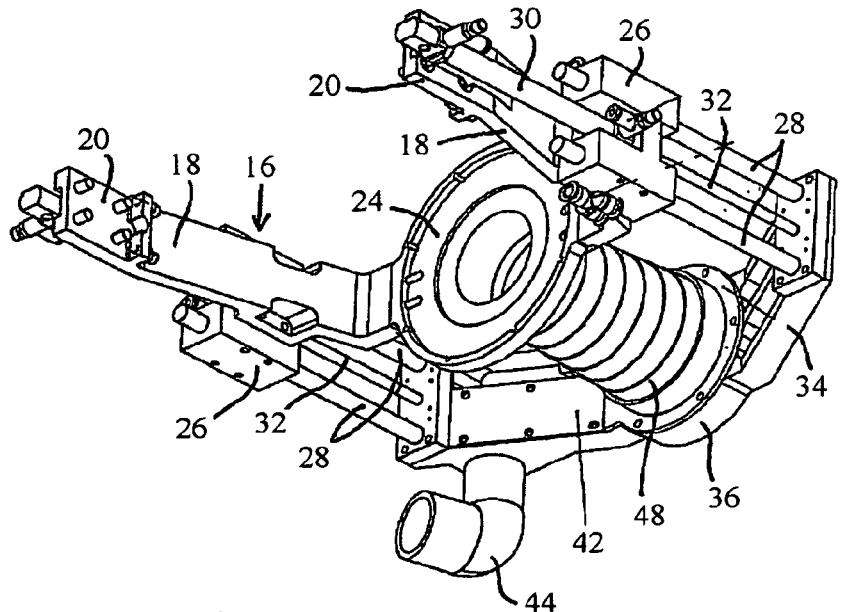
FIG. 3 is perspective view of the second embodiment of FIG. 2 as seen from a rear side.
Figure 4:
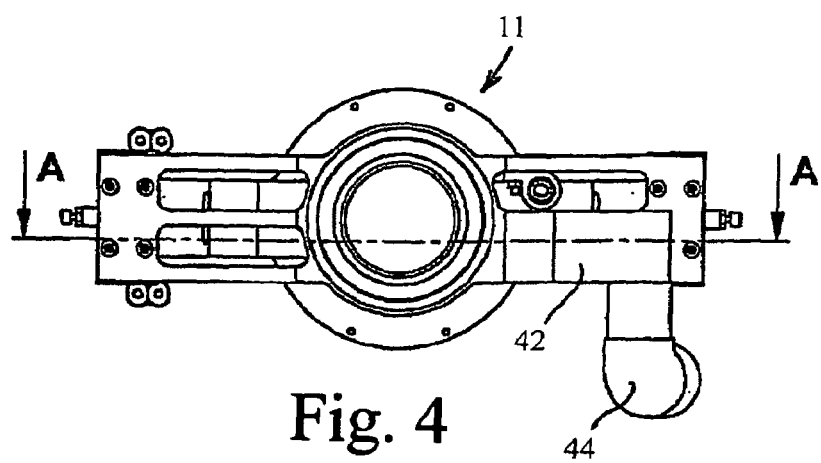
FIG. 4 is an end view of the second embodiment of FIG. 2.
Figure 5:
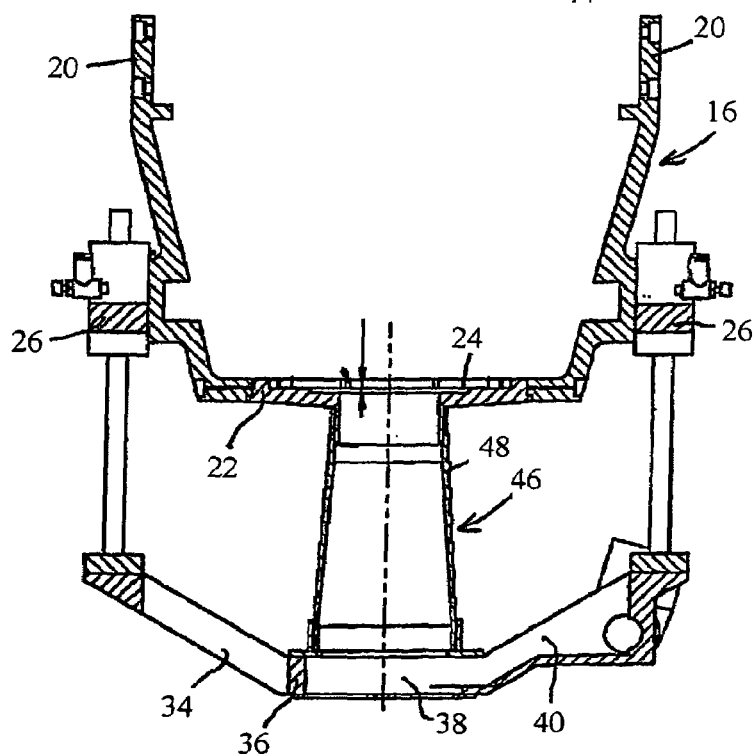
FIG. 5 is a cross-sectional view taken along the line A—A in FIG. 4.

FIGS. 2 and 3 are perspective views of a second embodiment of assembly 11 of the present invention. Assembly 11 is adapted to be attached to a front portion of an outer housing 12 of an orbital drilling machine 14 (FIG. 6), or any other type of material working machine for drilling or milling holes or recesses in a workpiece, where cuttings and chips are to be removed from the working area.

Assembly 11 includes a U-shaped support structure 16 having two opposed side legs 18 with a rear fastening section 20 for fixating support structure 16 to the axially movable housing 12 of machine 14. Legs 18 are interconnected by a central hub portion 22 which has a cylindrical recess 24 for receiving a front end of an orbiting spindle carrying a rotary cutting tool (not shown) with a small axial play between the bottom of the recess and the end of the spindle. To the outer side of each leg 18 is mounted a respective guide block 26 for linear guidance of two guide rods 28. A cylinder 30 of a pneumatic spring generating a substantially constant force is attached the rear end of each leg 18 and to guide block 26 and has a piston rod 32 extending through block 26. Guide rods 28 and piston rod 32 are fixated to a respective end of a yoke-shaped pressure foot 34, which interconnects the two pairs of guide rods 28 and piston rods 32. Pressure foot 34 carries a central circular housing 36 defining a chamber 38 for receiving cuts from the hole or recess being formed in a workpiece against --which pressure foot 34 is biased by pneumatic springs 30, 32. Chamber 38 communicates with a channel 40, which extends through a branch 42 of pressure foot 34, and is connected to a vacuum source (not shown) via a tubular outlet socket 44.

The one end of an axially expandable and collapsible tubular member 46 is attached to central housing 36, while the other end is attached to central hub portion 22 of support structure 16. Tubular member 46 is configured to accommodate the cutting tool and to define a substantially closed space around it, which could be reduced in volume when the cutting tool advances into the workpiece. Tubular member 46 preferably includes a telescopic spring made of a helically wound strip 48 of a spring material, such as spring steel. Such a tubular member 46 may easily be collapsed to an axial dimension substantially equal to the width of strip 48. Alternatively, tubular member 46 may be formed as a resilient bellows. In its most expanded position the axial length of tabular member 46 is such that the tip of the cutting tool mounted to the orbiting spindle will not protrude from the surface of central housing 36 which engages the workpiece.

When starting a hole-forming procedure, pressure foot 34 is held at a maximal extended position relative to the drilling machine by way of pneumatic springs 30, 32. Housing 12 of orbital drilling machine 14 is fed axially towards the workpiece by an axial feed motor 50 (FIG. 6) until pressure foot 34 slightly compresses tubular member 46 when it contacts the surface of the workpiece. During further axial advancement of the cutting tool into the workpiece, guide blocks 26 slides forwardly along guide rods 28 against the constant spring force of pneumatic springs 30, 32, while collapsing tubular member 46 axially. Cuttings and chips generated by the cutting tool are removed by the vacuum source via chamber 38, channel 40 and outlet socket 44 during the whole cutting operation so that the hole will not be jammed thereby and the environment will be protected from being polluted.

Figure 6:
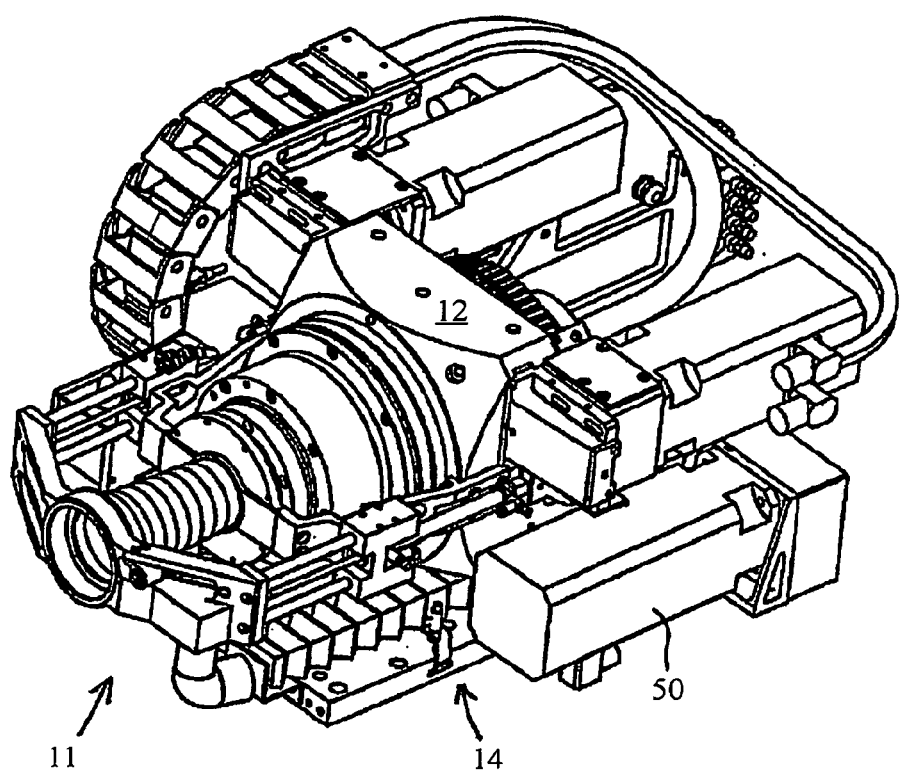
FIG. 6 is a perspective view of an orbital drilling machine to which the assembly of FIGS. 2–5 is attached.
Figure 7:
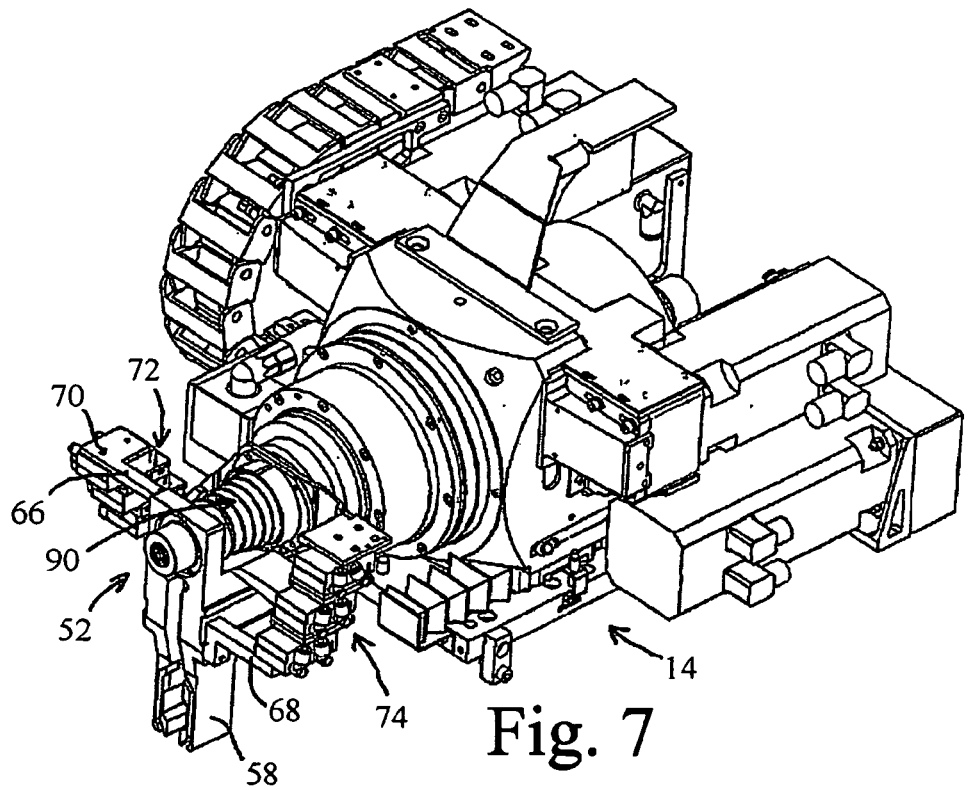
FIG. 7 is a perspective view similar to FIG. 6 and illustrates a similar orbital drilling machine coordinated with a third embodiment of a cuttings-removing assembly of the present invention.
Figure 8:
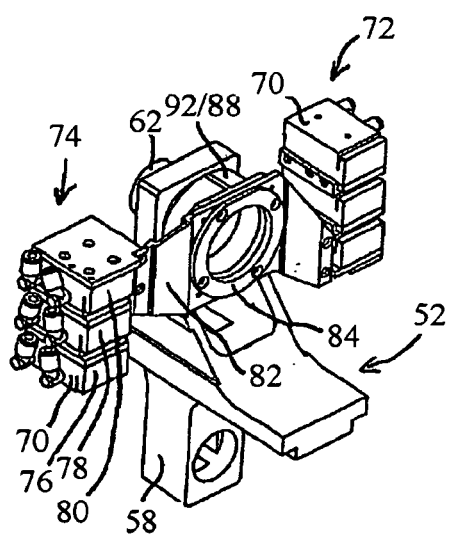
FIGS. 8 and 9 are perspective views of the assembly of FIG. 7, seen from the rear side thereof and in an axially collapsed and expanded position, respectively.
Figure 9:
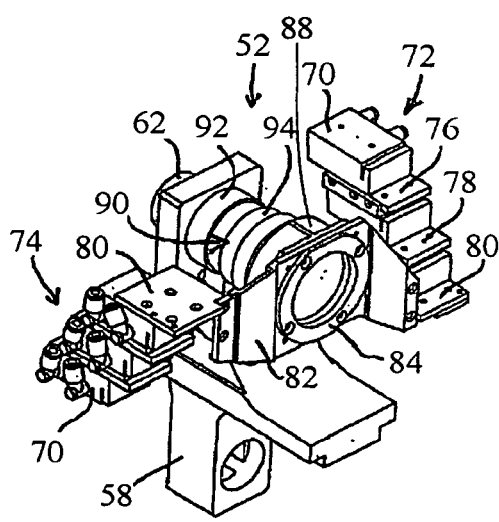

FIG. 7 is a perspective view similar to FIG. 6 and illustrates a similar orbital drilling machine 14 coordinated with a third embodiment of a cuttings-removing assembly 52 of the present invention. FIGS. 8 and 9 are perspective views of this assembly, seen from the rear side thereof and in an axially collapsed and expanded position, restively.

Figure 10:
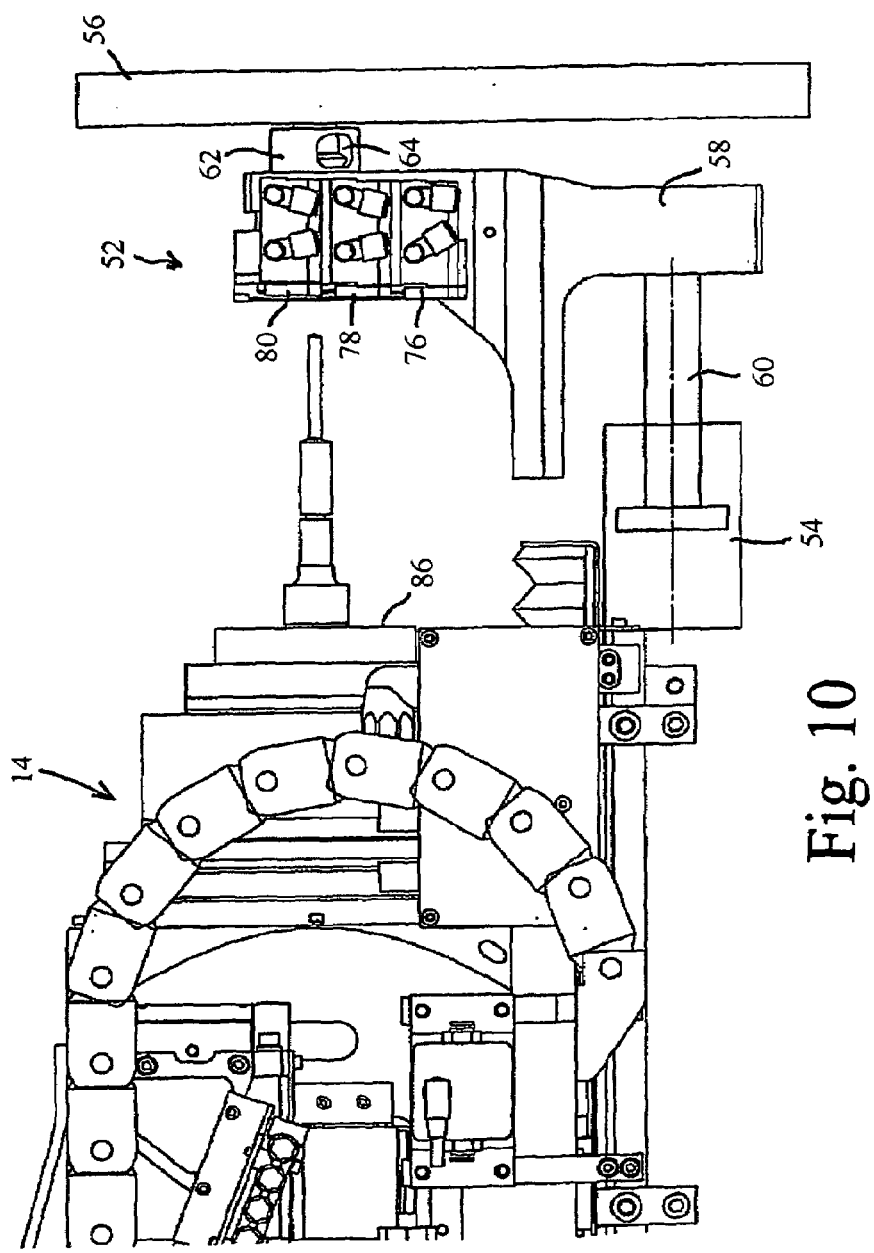
FIG. 10 is a side view of a front portion of an orbital cutting machine and the third embodiment of the assembly in a retracted, unexpanded position in which a tool exchanging operation may take place.

In contrast to the second embodiment, assembly 52 of the third embodiment is configured to be mounted to a support 54, which is fixed relative to workpiece 56 during the working of a hole therein. Assembly 52 includes a central upright member 58 attached to support 54 via an axially adjustable piston rod 60 (FIG. 10). A cylindrical housing 62 defining a chamber for receiving cuttings from the hole or recess being formed is mounted at the top of upright 58 facing workpiece 56. Housing 62 has an outlet opening 64 which is connected to a vacuum source via a hose (not shown) for removing the cuttings from the working area. An upper and a lower lateral bracket 66 and 68 are attached to upright 58 for holding a respective upper and lower, fixed end section 70 of a telescopic pneumatic spring unit 72 and 74. Each spring unit 72, 74 further includes three sections 76, 78, 80 which are axially extendable by separate pneumatic cylinders. The outermost sections 80 of the spring units are carrying between them a cross-piece 82 having a central ring-shaped pressure plate 84 to be engaged by the outer end surface 86 of the orbiting spindle of the drilling machine. As best seen in FIGS. 7 and 9, telescoping sections 76, 78, 80 of spring unit 72 form, in its expanded condition, a stair going downwards, while the corresponding sections of spring unit 74 form a stair going upwards.

Cross-piece 82 also holds one end 88 of an axially expandable and collapsible tubular member 90, the other end 92 of which is attached to upright 58 concentrically to housing 62. Like in the first and second embodiments, tubular member 90 is configured to accommodate the cutting tool and to define a substantially closed space around it, which can be reduced in volume when the cutting tool advances into the workpiece. Thus, tubular member 90 preferably includes a telescopic spring made of a helically wound strip 94 of a spring material, such as spring steel. Such a tubular member 90 may easily be collapsed to an axial dimension substantially equal to the width of strip 94.

Pneumatic spring units 72, 74 are adapted to generate a substantially constant spring force that bias tubular member 90 towards the end surface 86 of the tool spindle through pressure plate 84. As shown in FIG. 10, which is a side elevational view showing the mutual positions of assembly 52 and drilling machine 14 during a tool changing phase, telescopic spring sections 76, 78, 80 may be retracted by their respective cylinders to provide a free space between the assembly 52 and the drilling machine for enable easy exchange of the cutting tool.

Pneumatic springs 30 and spring units 72, 74 referred to above can alternatively be formed as hydraulic or electric units for controlling the expansion and retraction of tubular member 46, 90.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An assembly for removing chips from a cutting tool working area on a workpiece, said assembly comprising:
    an axially expandable and collapsible tubular member for at least partially enclosing the cutting tool working area and including a first end and a second end;
    a support structure for supporting said first end of said axially expandable and collapsible tubular member;
    a cross-piece for supporting said second end of said axially expandable and collapsible tubular member;
    at least one biasing spring being configured and arranged for resiliently biasing said support structure and said cross-piece away from one another;
    a housing having a chips-receiving chamber located adjacent one of said first end and said second end for engagement with the working area of the workpiece, said chips-receiving chamber including an outlet being configured to be connected to a vacuum source for removing a plurality of chips from said chamber; and
    a hub portion located at an other of said first end and said second end, said hub portion being configured for engagement with a cutting machine.

2. The assembly of claim 1, wherein at least one said biasing spring constitutes said axial expandable and collapsible tubular member, at least one said biasing spring is configured as a telescopic resilient spring made of a helically wound strip.

3. The assembly of claim 1, wherein said support structure is carrying said housing with said chips-receiving chamber and is arranged to be fixated close to the working area of the workpiece, said cross-piece is carrying said hub portion for a biased engagement with the cutting machine.

4. The assembly of claim 3, wherein said at least one biasing spring includes at least one pneumatic telescopic cylinder unit attached at one end thereof to said support structure, said pneumatic telescopic cylinder unit attached at an other end thereof to said cross-piece.

5. The assembly of claim 4, wherein at least one said pneumatic telescopic cylinder unit is arranged on each side of said tubular member.

6. The assembly of claim 1, wherein said cross-piece carries said housing with said chips-receiving chamber for a biased engagement with the working area of the workpiece, said support structure is configured to be mounted to an axially movable, non-rotating component of the cutting machine, said support structure is carrying said hub portion adjacent a spindle of the cutting machine.

7. The assembly of claim 6, further including a plurality of guide members being attached to said support structure and said cross-piece to facilitate a mutual linear displacement of said support structure and said cross-piece.

8. The assembly of claim 7, wherein said support structure includes a U-shaped bracket with a plurality of side legs interconnected by said hub portion, each of said plurality of side legs provided with a section for fixation of said support structure to a non-rotating component of the cutting machine.

9. The assembly of claim 8, wherein said cross-piece includes a yoke member with said housing located centrally on said yoke member, said plurality of guide members includes a plurality of guide rods attached to opposite end sections of said yoke member, said plurality of guide members attached to said support structure for interaction with said plurality of guide rods.

10. The assembly of claim 7, wherein said at least one biasing spring includes at least one pneumatic telescopic cylinder unit attached at one end thereof to said support structure, at least one said pneumatic telescopic cylinder unit attached at an other end thereof to said cross-piece.

11. The assembly of claim 10, wherein at least one said pneumatic telescopic cylinder unit is arranged on each side of said tubular member.

* * * * *

UNITED STATES PATENT AND TRADEMARK OFFICE
CERTIFICATE OF CORRECTION

| | |
|---|---|
| PATENT NO. | : 7,168,894 B2 |
| APPLICATION NO. | : 10/528904 |
| DATED | : January 30, 2007 |
| INVENTOR(S) | : Hansson et al. |

Page 1 of 1

It is certified that error appears in the above-identified patent and that said Letters Patent is hereby corrected as shown below:

TITLE PAGE
   In column 1, for PCT No. item (86), please delete "PCT/SE03/01500", and substitute therefore --PCT/SE03/0015000--.

COLUMN 3
   At line 41, between "attached" and "the", please insert --to--.; and
   At line 67, please delete "tabular", and substitute therefore --tubular--.

Signed and Sealed this

Twentieth Day of November, 2007

JON W. DUDAS
*Director of the United States Patent and Trademark Office*